US009613023B2

(12) United States Patent
Kennard et al.

(10) Patent No.: US 9,613,023 B2
(45) Date of Patent: Apr. 4, 2017

(54) SYSTEM AND METHOD FOR GENERATING ETHNIC AND CULTURAL EMOTICON LANGUAGE DICTIONARIES

(71) Applicants: Wayne M. Kennard, Lexington, MA (US); Winston E. Henderson, Boston, MA (US)

(72) Inventors: Wayne M. Kennard, Lexington, MA (US); Winston E. Henderson, Boston, MA (US)

( * ) Notice: Subject to any disclaimer, the term of this patent is extended or adjusted under 35 U.S.C. 154(b) by 169 days.

(21) Appl. No.: 13/999,773

(22) Filed: Mar. 20, 2014

(65) Prior Publication Data

US 2014/0303964 A1 Oct. 9, 2014

Related U.S. Application Data

(60) Provisional application No. 61/853,415, filed on Apr. 4, 2013.

(51) Int. Cl.
*G06F 17/27* (2006.01)
*G06Q 50/00* (2012.01)

(52) U.S. Cl.
CPC ......... *G06F 17/2735* (2013.01); *G06Q 50/01* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775

USPC .................................................. 704/1, 9, 10
See application file for complete search history.

(56) References Cited

U.S. PATENT DOCUMENTS

| 6,618,719 | B1 * | 9/2003 | Andrei ............. G06F 17/30471 |
| 6,708,189 | B1 * | 3/2004 | Fitzsimons ....... G06F 17/30569 |
| 2002/0067373 | A1 * | 6/2002 | Roe ........................ G01V 11/00 |
| | | | 715/762 |
| 2002/0120639 | A1 * | 8/2002 | Basin ................ G06F 17/30153 |
| 2005/0120041 | A1 * | 6/2005 | Wesinger, Jr. ...... G06F 17/3089 |
| 2005/0187897 | A1 * | 8/2005 | Pawar ............... G06F 17/30339 |

(Continued)

OTHER PUBLICATIONS

Wikpedia, List of Emoticons, wikipedia.org, https://en.wikipedia.org/wiki/List_of_emoticons, 2012, pp. 1-6.*

(Continued)

*Primary Examiner* — Lamont Spooner

(57) ABSTRACT

A computer-implemented system and method for developing ethnic and cultural emoticons that are downloadable or uploadable to smart devices or devices, such as laptops, smartphones, and tablet devices, for fast and efficient communications between smart device or other users is disclosed. The computer-implemented system and method also provides for updating cultural or ethnic dictionaries on a periodic basis to reflect the changing nature of language being used by ethnic and cultural groups so that effective communications can be carried out as these changes take place. The computer-implemented system and method include at least a system server connected to the Internet or similar wireless network and one or more databases connected to the system server that will store the ethnic and cultural dictionaries.

15 Claims, 9 Drawing Sheets

(56) References Cited

U.S. PATENT DOCUMENTS

| | | | |
|---|---|---|---|
| 2007/0162894 A1* | 7/2007 | Noller | G06F 11/3688 717/124 |
| 2011/0225515 A1* | 9/2011 | Goldman | G06Q 10/10 715/757 |
| 2012/0215790 A1* | 8/2012 | Roizen | A45D 44/005 707/748 |
| 2012/0259616 A1* | 10/2012 | Peng | G06F 17/274 704/9 |

OTHER PUBLICATIONS

Wikipedia, About, wikipedia.org, https://en.wikipedia.org/wiki/Wikipedia:About, 2012, pp. 1-12.*

Clough et al., Informal Learning Evidence in Online Communities of Mobile Enthusiasts, Mobile learning: Transforming the delivery of education and training, 2009, Athabasca University Press, pp. 99-112.*

Wikimedia servers, Wikimedia, 2012, Wikimedia.org., https://meta.wikimedia.org/wiki/Wikimedia_servers, pp. 1-4.*

* cited by examiner

- Smile
- Surprised
- Wink
- Confused
- Crying
- Hot
- Angel
- Don't tell anyone
- Nerd
- Secret telling
- I don't know
- Party
- Sleepy

- Open-mouthed
- Tongue out
- Sad
- Disappointed
- Embarrassed
- Angry
- Devil
- Baring teeth
- Sarcastic
- Sick
- Thinking
- Eye-rolling

Prior Art

← 75

| Letter | Text Emoticon | Description |
|---|---|---|
| A | | |
| | (.V.) | Alien |
| | O:–) | Angel |
| | X–( | Angry |
| B | | |
| | ~:0 | Baby |
| | :– D | Big Grin |
| | (*v*) | Bird |
| | : – # | Braces |
| | </3 | Broken Heart |
| C | | |
| | =^.^= | Cat |
| | *<:o) | Clown |
| | O.o | Confused |
| | :–S | Confused |
| | B–) | Cool |
| | :_( | Crying |
| | :'( | Crying |
| D | | |
| | \:D/ | Dancing |

Figure 2B

Prior Art

← 75

|   |   | *_* | Dazed |
|---|---|---|---|
|   |   | :o3 | Dog |
|   |   | #-3 | Doh! |
|   |   | :*) | Drunk |
| E |   |   |   |
|   |   | //_^ | Emo |
|   |   | >:) | Evil Grin |
| F |   |   |   |
|   |   | <>< | Fish |
|   |   | :-( | Frown |
|   |   | :( | Frown |
|   |   | :-( | Frowning |
|   |   | =P | Frustrated |
|   |   | :=P | Frustrated |
| G |   |   |   |
|   |   | 8-) | Glasses |
|   |   | $_$ | Greedy |
|   |   | :-> | Grin |
| H |   |   |   |
|   |   | =) | Happy |
|   |   | :-) | Happy |

Figure 2C

Prior Art

75

| | | :) | Happy |
|---|---|---|---|
| | | # | Hashtag |
| | | <3 | Heart |
| | | {} | Hug |
| I | | | |
| | | :−| | Indifferent |
| J | | | |
| | | X − p | Joking |
| K | | | |
| | | :−)* | Kiss |
| | | :−* | Kiss |
| | | (−}{−) | Kissing |
| L | | | |
| | | XD | Laughing |
| | | = D | Laughing Out Loud |
| | | ) −: | Left-Handed Sad Face |
| | | (−: | Left-Handed Smiley Face |
| | | <3 | Love |
| M | | | |
| | | =/ | Mad |
| | | :−) (−: | Married |

Figure 2D

Prior Art

← 75

|   |   |   |   |
|---|---|---|---|
|   |   | @ | Mention |
|   |   | <:3)~ | Mouse |
| N |   |   |   |
|   |   | ~,~ | Napping |
|   |   | :−B | Nerd |
| O |   |   |   |
|   |   | ^_^ | Overjoyed |
| P |   |   |   |
|   |   | <I:0 | Partying |
|   |   | :−/ | Perplexed |
|   |   | =8) | Pig |
| Q |   |   |   |
| R |   |   |   |
|   |   | @~)~~~~ | Rose |
| S |   |   |   |
|   |   | =( | Sad |
|   |   | :−( | Sad |
|   |   | :( | Sad |
|   |   | :−7 | Sarcastic |
|   |   | :−@ | Screaming |
|   |   | =O | Shocked |

Figure 2E

Prior Art

75

|   |   |     |                    |
|---|---|-----|--------------------|
|   |   | :-o | Shocked            |
|   |   | :-) | Smile              |
|   |   | :)  | Smile              |
|   |   | :-Q | Smoking            |
|   |   | :>  | Smug               |
|   |   | :P  | Sticking Tongue Out|
|   |   | :o  | Surprised          |
| T |   |     |                    |
|   |   | :-J | Tongue in Cheek    |
|   |   | :-& | Tongue-Tied        |
| U |   |     |                    |
|   |   | =-O | Uh-Oh              |
|   |   | :-\ | Undecided          |
| V |   |     |                    |
|   |   | :-E | Vampire            |
|   |   | =D  | Very Happy         |
| W |   |     |                    |
|   |   | ;-) | Winking            |
|   |   | ;)  | Winking            |
| X |   |     |                    |
| Y |   |     |                    |

Figure 2F

Prior Art

75

|   | —O | Yawn |
|---|---|---|
| Z |   |   |
|   | 8 – # | Zombie |

US 9,613,023 B2

SYSTEM AND METHOD FOR GENERATING ETHNIC AND CULTURAL EMOTICON LANGUAGE DICTIONARIES

RELATED APPLICATIONS

This application claims the benefit under 35 U.S.C. §119 (e) of U.S. Provisional Patent Application Ser. No. 61/853, 415 filed Apr. 4, 2013, entitled "A System and Method for Generating Cultural Emoticon Language Dictionaries," which is incorporated by reference herein in its entirety.

FIELD OF THE INVENTION

The system and method of the present invention relate to generating emoticons for use in textual and visual media for conveying an emotional feeling or belief of the entity sending a message using such textual or visual media. More specifically, the system and method of the present invention relate to developing and updating ethnic and cultural emoticons for use in textual and visual media for conveying an emotional feeling or belief of the entity sending a message using such textual or visual media.

BACKGROUND OF THE INVENTION

In recent years there has been an increase in use of emoticons to represent language or the feelings of the writer of text or the individual displaying information on visual media, such as a computer screen or the display of a smart phone or tablet device. This has been done through the use of emoticons for some time. One of the most famous visual emoticons is the "Smiley Face" emoticon: This visual emoticon has been defined as representing "happiness" across many different cultures and ethnic groups. This visual emoticon and some others are shown in FIG. 1 generally at 50.

There is currently a large textual emoticon dictionary that is based on a number of different keystrokes. Representative textual emoticons are shown in FIGS. 2A-2F, generally 75. The textual emoticons, however, are based generally on using a standard English typewriter keyboard. Accordingly, other keyboard characters if used from different language keyboards may not necessarily provide the same meaning in the same way as those shown in FIGS. 2A-2F. Further, the images in the current textual emoticon dictionary may have significant negative connotations to, or not viewed in the same way by, a particular ethnic or cultural group.

Regarding visual emoticons, certain visual representations for emoticons may be accurate for some ethnic and cultural groups but not for others. For example, a particular emoticon in one culture may not portray the same specific emotion for which it was originally created in another culture.

Noting the above, there is a lack of emoticon dictionaries to accurately reflect the language of the various ethnic and cultural groups in any one country around the world. If there were such emoticon dictionaries, there is also a need to update these dictionaries in an efficient and timely manner. This is necessary because of the generational changing nature of language.

Further, subgroups within larger cultural and ethnic groups may have separate emoticons that present the context and connotations most recognizable by them. So, as emoticon dictionaries are being developed and updated, subsets of the dictionaries also would be needed to be developed for particular subgroups so that effective communications through emoticons can be effected.

There is a need for a system and method for developing ethnic and cultural emoticons and that system and method must also be able to update the ethnic and cultural emoticon dictionaries in an efficient and timely manner so as to reflect the changing nature of the language used by the members of ethnic and cultural groups.

SUMMARY OF THE INVENTION

The present invention is a computer-implemented system and method for developing ethnic and cultural emoticons that are downloadable or uploadable to smart devices or devices, such as laptops, smartphones, and tablet devices, for fast and efficient communications between smart device or other users. The computer-implemented system and method of the present invention also provides for updating cultural or ethnic dictionaries on a periodic basis to reflect the changing nature of language being used by ethnic and cultural groups so that effective communications can be carried out as these changes take place. The system and method of the present invention include at least a system server connected to the Internet or similar wireless network and one or more databases connected to the system server that will store the ethnic and cultural dictionaries.

The present invention will meet the increased need for users of smart devices, e.g., smart phones, smart tablet devices, and similar devices, for using visual emoticons to replace textual language in communication messaging. This provides a great advantage over typical SMS/text messaging given that many text message formats are limited to 160 characters. Therefore, if a single visual emoticon can replace a number of words, the SMS/text message user can increase the amount of information in the message content transmitted within the 160 character limit. Further, the present invention provides visual ethically- and culturally-based emoticons that provide greater ease in communications between members of ethnic and cultural groups besides the use of conventional visual emoticons.

If someone were to spend considerable time with any particular ethnic or cultural group, that person would understand that in many cases there is a totally different commonly used language particular to these groups that are not accurately expressed by the most commonly used emoticons. These particular cultural and ethnic groups in communicating with one another and even outside their groups using smart devices would particularly desire use the visual emoticon dictionaries developed according to the present invention that would more accurately represent the context and connotation most recognizable by their particular group. Further, these cultural and ethnic groups would take great pride in the ability to communicate with ethnic or cultural group members with emoticons that truly reflect their ethnicity and cultural heritage.

System and method of present invention carries out the development and updating of ethnic and cultural emoticons that form or later become part of emoticon dictionaries by crowdsourcing. Ethnic and cultural group members will provide crowdsourcing information with regard to ethnic and cultural emoticons for the ethnic and cultural emoticon dictionaries stored in system databases that will be evaluated and after passing the evaluation process will be placed in the appropriate emoticon dictionary.

The databases, under the control of the system server, will store ethnic and cultural emoticon dictionaries that can be accessed by system users. These emoticon dictionaries may be downloaded from the databases by system user devices via the system server and the Internet via wireless communication links. Once downloaded, the system users may readily use these visual ethnic and cultural emoticons in their messaging activities via SMS, email, Facebook, Twitter, or other messaging type service.

These other embodiments of the present invention will be described in greater detail referring to the drawings.

BRIEF DESCRIPTION OF THE DRAWINGS

Figure 2F:
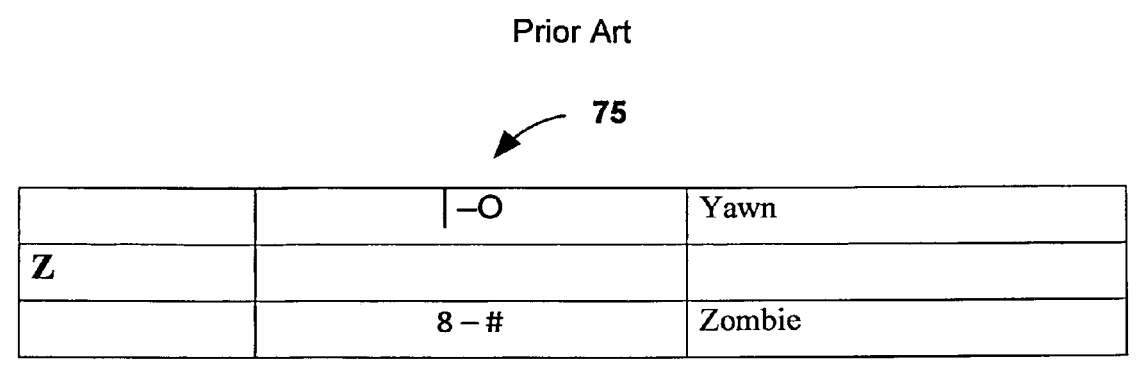

FIGS. 2A-2F shows selected text emoticons that are currently being used.

DESCRIPTION OF THE INVENTION

The present invention is a computer-implemented system and method for developing ethnic and cultural emoticons that are downloadable or uploadable to smart devices or devices, such as laptops, smartphones, and tablet devices, for fast and efficient communications between a sender and recipient, e.g., between two smart devices. The computer-implemented system and method of the present invention may be updated on a periodic basis to reflect the changing nature of language being used by ethnic and cultural groups so that effective communications can be carried out as these changes take place.

The present invention will meet the increased need for users of smart devices, e.g., smart phones, smart tablet devices, and similar devices, for using visual emoticons to replace textual language in communication messaging. This provides a great advantage over typical SMS/text messaging given that many text message formats are limited to 160 characters. Therefore, if a single visual emoticon can replace a number of words or characters, the SMS/text message user can increase the amount of information in the message content transmitted within the 160 character limit. The present invention provides greater ease in communications between members of ethnic and cultural groups besides the use of conventional visual emoticons.

Given SMS/text message users and other users of smart devices generally, the development of visual language emoticons dictionaries according to the present invention expands the limited, small number commonly used visual emoticons by adapting the dictionaries to be tailored to very specific ethnic and cultural groups in a culturally/ethnic acceptable way.

Each particular ethnic or cultural group has totally different commonly used language that is not accurately expressed by most commonly used emoticons. These particular cultural and ethnic groups in communicating with one another and even outside their small groups using smart devices would particularly desire to use visual emoticon dictionaries developed according to the present invention that would more accurately represent the context and connotation most recognizable by their particular groups. Cultural and ethnic group members would take great pride in the ability to communicate with other group members with emoticons that truly reflect their ethnicity and cultural heritage.

Figure 1:
FIG. 1 shows selected visual emoticons that are currently being used.
Figure 3:
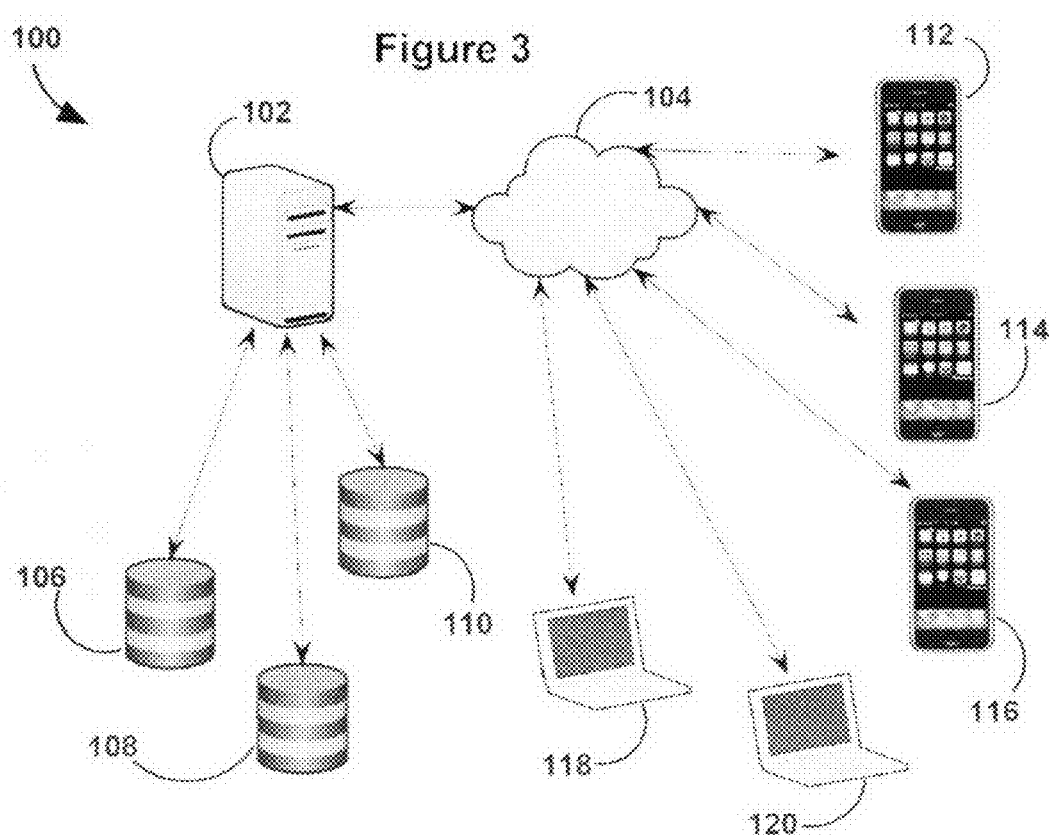
FIG. 3 shows a representative system for carrying the present invention for generating and updating ethnic and cultural emoticon dictionaries.

Referring to FIG. 3, generally at 100, the system for carrying out the present invention preferably includes at least system server 102 connected to the Internet 104 or similar wireless network and one or more databases 106, 108, and 110 under the control of the system server. Although, only one system server and three databases are shown, more or less than each of these may be used and still be within the scope of the present invention. System server 102 includes at least a processor, input and output subsystems, and memory.

Databases 106, 108, and 110, under the control of system server 102, will store ethnic and cultural emoticon dictionaries that can be accessed by system users 112, 114, and 116. These emoticon dictionaries may be downloaded by the system users from the databases via system server 102 and Internet 104 via wireless links to the Internet that are shown in FIG. 3. Once downloaded, system users 112, 114, and 116 may readily use these visual ethnic and cultural emoticons in their messaging activities via SMS, email, Facebook, Twitter, or other messaging type service.

The system server also provides system users access to the portions of the databases that receive uploaded crowdsourced information regarding particular potential emoticons that have been uploaded for evaluation for inclusion in a particular ethnic or cultural emoticon dictionary. This will be explained in greater detail with regard to FIG. 5.

The system and method of present invention also carry out the development and updating of the ethnic and cultural emoticons that form or later become part of emoticon dictionaries by crowdsourcing. For example, crowdsourcing can be provided by representative users of laptops 118 and 120. These users would provide crowdsourcing information regard to potential ethnic and cultural emoticons for inclusion in the ethnic and cultural emoticon dictionaries stored in databases 106, 108, and 110.

According to computer-implemented system and method of the present invention, ethnic and cultural emoticon dictionaries will be set up in databases 106, 108, and 110. Via crowdsourcing, ethnic and cultural emoticons will be uploaded by individuals, such as those using laptops 118 and 120, to system server 102 and stored in one of databases as potential emoticons for inclusion in the ethnic and cultural emoticon dictionaries.

A system administrator/operator (not shown) is connected to databases 106, 108, and 110 through system server 102. The system administrator/operator will control the evaluation process that includes the receipt of the crowdsourced ethnic and cultural emoticons uploaded from individuals for potential inclusion in ethnic or cultural emoticon dictionaries and the crowdsourced evaluation of these uploaded emoticons, such as those from laptops 118 and 120. Although, only two laptops are shown, it is understood that crowdsourced information for the potential inclusion of emoticons in the ethnic and cultural emoticon dictionaries will include a much larger number than two so that consensus can be reached regarding the uploaded ethnic and cultural emoticons. Further, the crowdsourced information may uploaded by smart devices, such as smart phones, e.g., smart phones 112, 114, or 116, and smart tablet devices.

It is understood that the evaluation of the uploaded crowdsourced information for the inclusion of potential ethnic or cultural emoticons in the dictionaries can be carried out by the computer-implemented system of the present invention that is programmed for that purpose. Such programming will evaluate the uploaded crowdsourced information based on an algorithm that may or may not be a weighted algorithm. Hereafter, the evaluation entity, whether it is the system operator/administrator, a group of individuals, or the computer system programmed to conduct the evaluation of crowdsourced information, it will hereafter collectively by referred to as the "evaluation system."

When a system user, who preferably is a member of an ethnic or cultural group, uploads an emoticon for evaluation for inclusion in a particular ethnic or cultural dictionary, the computer system will make the proposed ethnic and cultural emoticon available in a specific section of the databases for a particular period of time so the crowdsourced information can be provided to evaluate whether the emoticon accurately expresses the contemplated emotion for members of the particular ethnic or cultural group. This period of time for evaluation of the emoticon through crowdsourcing may be a week or month or longer and still be within the scope of the present invention.

After period of time for evaluating the proposed ethnic or cultural emoticon has expired, the computer system will make the crowdsourced evaluations that have been received available to the evaluation system for review to determine whether the emotion to be represented by the image of the emoticon appears accurate for a specific ethnic or cultural group. If it does, the evaluation system will include the emoticon in the appropriate ethnic or cultural emoticon dictionary stored in databases. If it does not, the evaluation system may instruct the computer system to drop the proposed emoticon from the evaluation area of the databases. If an emoticon is dropped from evaluation area, it will be stored/archived in a database location for emoticons that have been dropped so that when new emoticons are being evaluated, the system can compare the newly uploaded emoticon with those in the stored/archive portion of a database to determine whether it has been evaluated before for a particular emotion. If it has, the evaluation system may permit emoticon to be evaluated again or not put it up for evaluation again. (See FIG. 5)

Each time a new ethnic or cultural emoticon is uploaded for crowdsourced evaluation, it will be checked against each of the ethnic and cultural emoticon dictionaries to determine if that emoticon and its associated emotion are currently part of that dictionary. If it is part of the primary ethnic or cultural dictionary for which it has been submitted, the newly uploaded ethnic or cultural emoticon will not be placed in the evaluation area of the databases. However, if in conducting this comparison it is found that either visual emoticon or the emotion it is intended to represent differ, then the newly up loaded emoticon will be placed in the evaluation area of the databases. This is done to elicit crowdsourced comments because either the visual emoticon or the emotion associated with it has changed with a specific ethnic or cultural group. (See FIG. 5)

The evaluation section of databases, when accessed by a system user for purpose of crowdsourcing a proposed ethnic or cultural emoticon, will provide a screen display for comments so that consensus from ethnic or cultural group members may be reached. The consensus may be determined by the computer system programmed for that purpose, the system administrator/operator or through some type of other selection mechanism, such as a selecting group, panel, or other method to determine which uploaded cultural and ethnic emoticons should be added to the various dictionaries.

Figure 4:
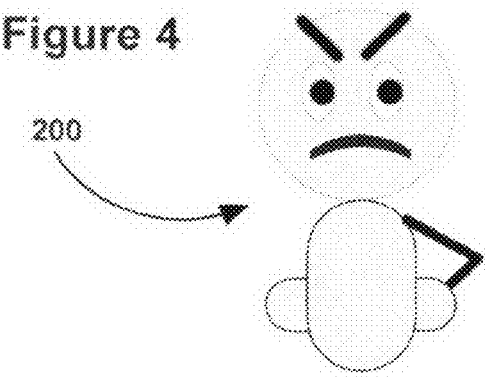
FIG. 4 shows a representative ethnic emoticon that can be generated by the system and method of the present invention.

Referring to FIG. 4, generally at 200, a proposed ethnic or cultural emoticon is shown for inclusion in a dictionary. The emoticon shows a partial figure with a "hand on a hip." Within the African-American community, this may express the emotion that someone is "copping an attitude" or has a "bad attitude." This is just an example is not to be inclusive of any particular emoticon for any ethnic or cultural group.

To process for adding a new emoticon, such as the emoticon shown at 200 in FIG. 4, to a dictionary will now be discussed referring to FIG. 5.

Figure 5:
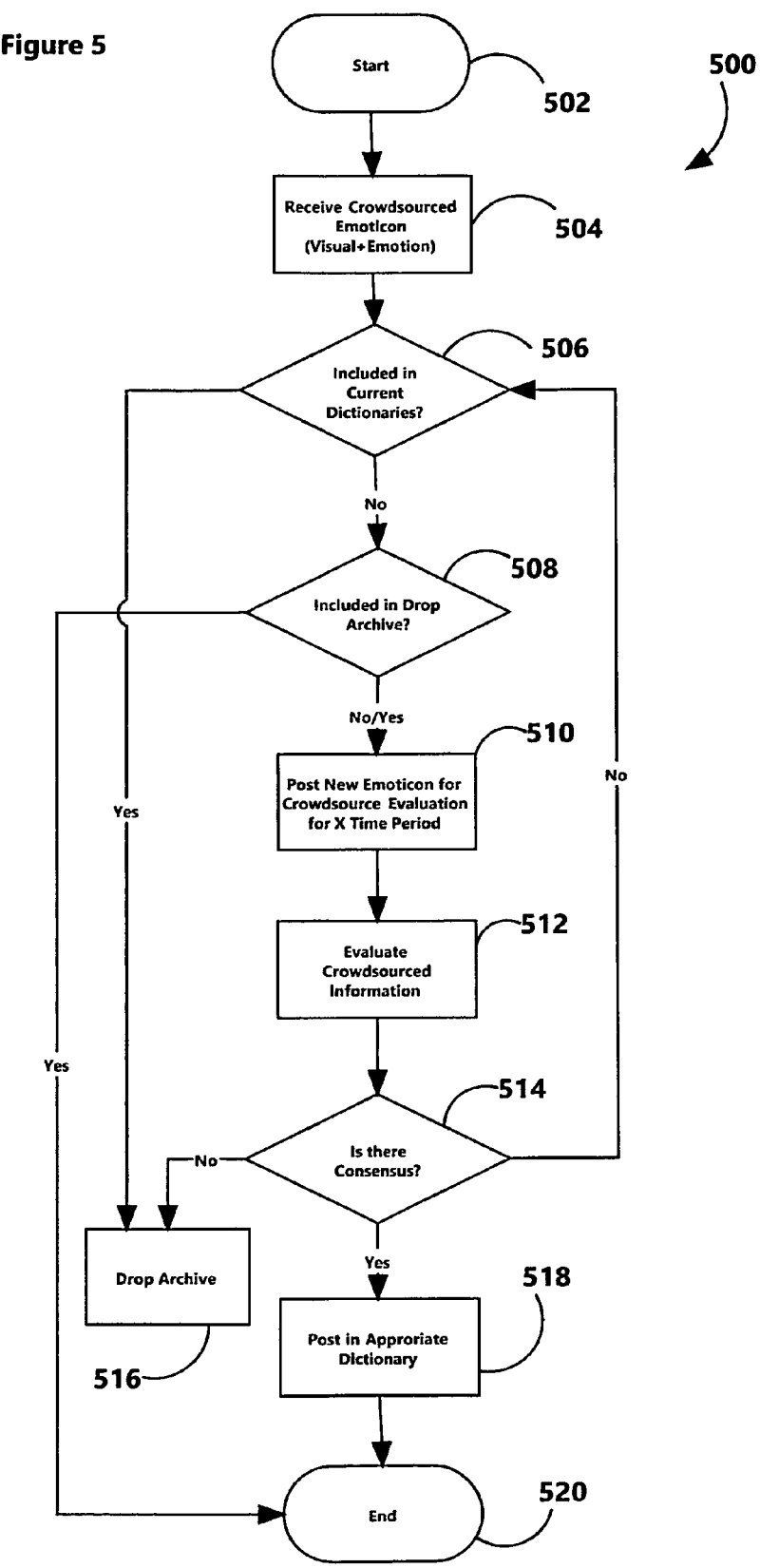
FIG. 5 shows a representative flow diagram for the computer-implemented method for processing new emoticons for addition to an ethnic or cultural emoticon dictionary.

Referring to FIG. 5, generally at 500, a flow diagram for the method by which new emoticons are processed for potential inclusion in an ethnic or cultural emoticon dictionary in the databases is shown. Referred to FIG. 5 at 502, the start of the computer-implemented method begins when cultural and ethnic groups engage in uploading cultural and ethnic emoticons to the system of the present invention for possible inclusion in an ethnic or cultural emoticon dictionary. The uploaded emoticons will include two parts: (1) the visual emoticon image and (2) the meaning of the emoticon. For example, if the emoticon in FIG. 4 is uploaded by someone from a cultural or ethnic group, what will be uploaded would be the emoticon image "hand on the hip" shown at 200 in FIG. 4 and the definition "copping an attitude." In this particular example, there is an assumption that this emoticon has been uploaded by someone in the African-American ethnic/cultural group.

Preferably, the entity uploading the new emoticon will designate a primary dictionary to which the new icon is proposed to be included. For example, if the icon shown in FIG. 4 is uploaded, the primary dictionary may be the African-American ethnic/cultural dictionary. This is preferred because the new emoticon is will be assessed by this group to determine whether or not it will to be particularly effective with respect to them. The emoticon also may be identified as existing in one or more secondary dictionaries when the search is conducted at 506, this information will be stored in system databases.

Once the new emoticon, such as the one shown in FIG. 4, is received by the system of the present invention at 504, the process proceeds to step 506 where it will be compared with emoticons in each of the dictionaries stored in the system databases, such as, for example databases 106, 108, and 110. The comparison that takes place will be with respect to both elements of the emoticon: the visual image and the meaning. The main search will be with respect to the primary dictionary designated by the entity uploading the emoticon. However, as previously stated, the other dictionaries will be searched and if there is a match this information will be stored in the database. In searching, there can only be a match if both of emoticon elements are matched.

If when the new emoticon is compared with the primary emoticon dictionary, a match is found with respect to an existing emoticon in the primary dictionary, the new emoticon will be sent to drop archive 516. The drop archive will store uploaded emoticons that are dropped from consideration by a system and method of the present invention. The archive of dropped emoticons will be searching at a later step to prevent the system from automatically posting for evaluation emoticon previously sent to the drop archive for some reason.

If the comparison conducted at step 506 indicates that the new emoticon does not match any emoticons in the primary emoticon dictionary, the process proceeds to step 508. At step 508, the new emoticon is compared with emoticons that exist in the drop archive. If there is a match, the system will provide that match to the system administrator/operator for review. The system administrator/operator can take one of two actions. The first is that if it is determine that the previous drop is considered still appropriate, the system user will instruct the system the present invention to proceed to and step 520, which will end processing of the new emoticon. The second is that even though there is a match, the system administrator/operator may continue to proceed with processing the emoticon because of changed conditions with respect to the original dropping of the emoticon or a period of time has passed and it may be appropriate to consider the dropped emoticon again because of a change in language of a particular ethnic or cultural group.

If after the processing at 508 there is not a match in the drop archive or the system system under certain conditions chooses to proceed with the previously dropped emoticon, the system proceeds to step 510 where the new emoticon is posted for crowdsource evaluation for predetermined period of time. For example, it could be posted for a week, a month, six months, etc. and would still be within the scope of the present invention. During the evaluation time, the crowd will evaluate whether the emoticon's two elements are reflective of the language and attitude of the particular cultural or ethnic group and it, therefore, should be added to the dictionary. The crowdsourced information from members of the cultural or ethnic group to which the primary dictionary applies will be uploaded.

The crowdsourced information that is gathered will be evaluated at 512 by the evaluation system. As indicated before, the evaluation system may be a program portion of the computer system, the system administrator/operator, a panel of individuals knowledgeable of the culture or ethnic group to which the new emoticon is to be added to the group dictionary, or other groups of people. All of these are within the scope of present invention. The evaluation system at 512 that will be evaluating the crowdsourced information will determine at 514 whether there is consensus in the group about the visual image and meaning such that the new emoticon should be added to the dictionary. In evaluating the crowdsourced information, the evaluation system will determine whether or not there is a sufficient number of responses to indicate a large enough number for which they could determine there is some level of consensus. If there is no consensus, the evaluation system will instruct the computer system to download the new emoticon to drop archive 516. Further, if there is no it consensus for a lack of a sufficient number of evaluations, the evaluation system will instruct the computer system to transmit the new emoticon back to step 506 for it to be evaluated again with the hope of getting a sufficient number of evaluations determine whether there is consensus. If there is consensus, the evaluation system will instruct the computer system to will proceed to step 518 where the new emoticon will be posted in the appropriate cultural or ethnic dictionary.

After the new emoticon is posted in the culture or ethnic dictionary, the system and method will move to end 520. Once the new emoticon is posted in the cultural or ethnic dictionary, it will be accessible by anyone choosing to use the emoticons in that dictionary.

Over time, the ethnic and cultural emoticon dictionaries stored in databases 106, 108, and 110 may be outdated and must be updated. The update of these dictionaries will be carried out on a periodic basis, for example, such as, biannually or annually. This update of the dictionaries would likely add some emoticons and remove others. Specifically, periodically, a group sufficiently knowledgeable of the cultural ethnic group to which a particular cultural or ethnic emoticon dictionary applies will review the context and dictionary determined whether one or more of the emoticons in a dictionary should be deleted from lack of use or change of language perspectives emoticons.

The ethnic and cultural emoticon dictionaries that are developed and updated according to this computer implemented method may be accessed by system users 112, 114, and 116 and downloaded for use in messaging. The download of the emoticon dictionaries may be free or for some charge, and it would still be within the scope of the present invention.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments, or portions thereof, may also be implemented as a machine-readable storage medium, configured with a computer program, where, upon execution, instructions in the computer program cause a machine to operate to perform the functions of the embodiments described above.

The embodiments, or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present invention is not intended to be limited to the embodiments shown or described herein.

The invention claimed is:

1. A computer-implemented system for developing and updating ethnic and cultural emoticon dictionaries through crowdsourcing, comprising:
   a plurality of smart devices capable of requesting and downloading ethnic and cultural dictionaries;
   a system server for controlling operations for development and updating of crowd sourced ethnic and cultural emoticon dictionaries and downloading requested ethnic and cultural dictionaries to the plurality of smart devices, with the system server having a capability to compare new emoticons input to the system server for addition to ethnic and cultural dictionaries by comparing each new emoticon's visual image and written meaning with a visual image and written meeting of emoticons stored in a dropped emoticon archive of a system database and if there is no match of the new emoticon's visual image and written meaning or there is only a match of the new emoticon's visual image or written meeting but not both, the new emoticon will be evaluated by crowdsourcing for addition to a cultural or emoticon dictionary, and if there is a match of the new emoticon's visual image and written meaning with a visual image and written meaning of any emoticons in the dropped emoticon archive, then the new emoticon will cease being processed by the system server;

a plurality of system databases electronically connected to the system server for storing ethnic and cultural emoticon dictionaries developed and updated by crowdsourcing and storing crowdsourced information for selection and in ethnic and cultural dictionaries and at least one system database including the dropped emoticon archive;

a plurality of computer-based systems for providing crowdsourced information through system server for storage in the plurality of databases for potential selection for inclusion in ethnic and cultural dictionaries; and a wireless network for connecting the plurality of smart phones and a plurality of computer-based systems for providing crowdsourced information to the system server.

2. The system as recited in claim 1, wherein a smart device includes a mobile device, tablet device, or laptop.

3. The system as recited in claim 1, wherein the system controller includes at least a processor, input output modules, and memory.

4. The system as recited in claim 1, wherein the system databases include one or more databases.

5. The system as recited in claim 4, wherein the system databases include at least a section for storing ethnic and cultural dictionaries and a section for receiving and reviewing crowdsourced information.

6. The system as recited in claim 1, wherein the wireless network includes as the Internet or World Wide Web.

7. A computer-implemented method for developing and updating ethnic and cultural emoticon dictionaries through crowdsourcing, comprising the steps of:

(A) a computer system receiving from a smart device of at least a member of an ethnic or cultural group a new emoticon for inclusion in a downloadable ethnic or cultural emoticon dictionary with the new emoticon including at least a visual image and a written meaning of the new emoticon, and with the member of the ethnic or cultural group transmitting with the new emoticon a primary dictionary to which the new emoticon is requesting to be included;

(B) the computer system comparing the new emoticon received at step (A) with emoticons that currently exist in the primary dictionary to which the new emoticon is requesting to be included and all secondary dictionaries that are stored in computer system databases, and if there is a match of the new emoticon's visual image and written meaning with a visual image and written meaning of any emoticons that exist in the primary dictionary, then step (F), otherwise step (C);

(C) the computer system comparing the new emoticon's visual image and written meaning with the visual image and written meaning of emoticons that are stored in a dropped emoticon archive of the computer system databases, if there is no match of the new emoticon's visual image and written meaning or there is only a match of the new emoticon's visual image or written meaning but not both, then step (D), and if there is a match of the new emoticon's visual image and written meaning with the visual image and written meaning of any emoticons in the dropped emoticon archive, then step (G);

(D) the computer system posting the new emoticon for crowdsource evaluation in the computer system databases accessible by third parties for a predetermined period of time and the computer system compiling the evaluation and transmitting same to an evaluation system to determine if there is consensus from the evaluations of the new emoticon's image and meaning for adding the new emoticon to the primary dictionary and if there is consensus, the evaluation system transmitting instructions to the computer system to add the new emoticon to the primary dictionary;

(E) the computer system processing the instructions from the evaluation system and posting the new emoticon in the downloadable primary dictionary, then step (G);

(F) the computer system receiving the new emoticon will cease processing the new emoticon; and (G) the consumer system awaiting receipt of another new emoticon and upon receipt of a new emoticon then step (A).

8. The method as recited in claim 7, wherein the computer system includes at least a system server in system databases.

9. The method as recited in claim 8, wherein the system server includes at least a processor, input output modules, and memory.

10. The method as recited in claim 8, wherein the system databases include one or more databases.

11. The method as recited in claim 10, wherein the system databases include at least a section for storing ethnic and cultural dictionaries and a section for receiving and reviewing crowdsourced information.

12. The method as recited in claim 7, wherein the wireless network includes as the Internet or World Wide Web.

13. The method as recited in claim 7, wherein the smart device includes a mobile device, tablet device, or laptop.

14. The method as recited in claim 7, wherein the primary dictionary includes a dictionary selected by the system user inputting an ethnic or cultural emoticon for which such ethnic or cultural emoticon is to be added.

15. The method as recited in claim 14, wherein the secondary dictionaries are all other dictionaries other than the primary dictionary.

* * * * *